Feb. 25, 1969

KATASHI AOKI 3,429,007

INJECTION MOLDING APPARATUS FOR MAKING SHOES

Filed March 30, 1966

INVENTOR
KATASHI AOKI
BY
Semmes & Semmes

Feb. 25, 1969 KATASHI AOKI 3,429,007
INJECTION MOLDING APPARATUS FOR MAKING SHOES
Filed March 30, 1966
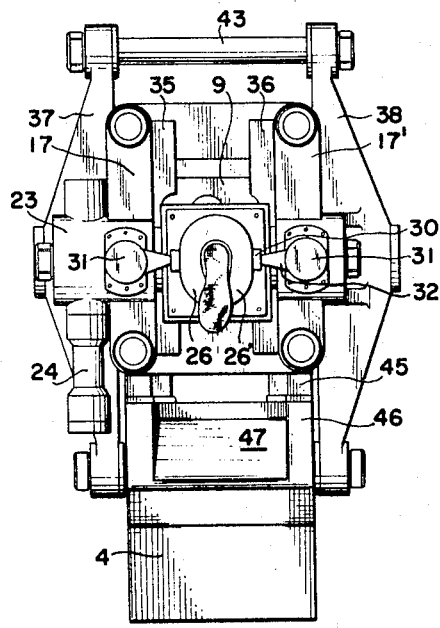
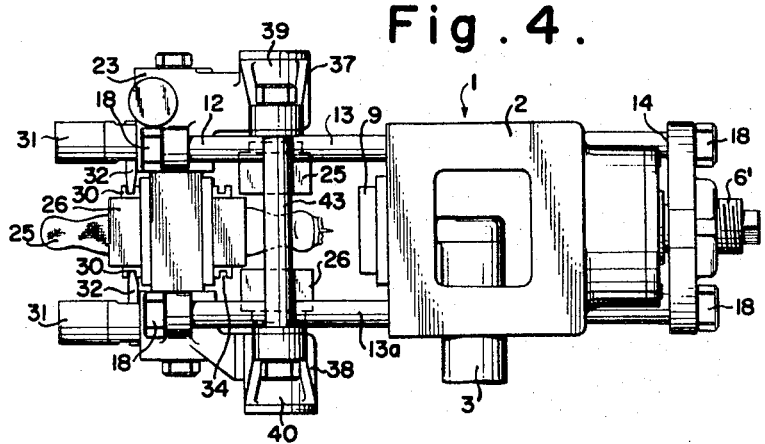
INVENTOR
KATASHI AOKI
BY
Semmes & Semmes United States Patent Office 3,429,007
Patented Feb. 25, 1969

3,429,007
INJECTION MOLDING APPARATUS FOR MAKING SHOES
Katashi Aoki, 6037 Oaza Nanjyo, Sakaki-machi, Hanishina-gun, Nagano-ken, Japan
Filed Mar. 30, 1966, Ser. No. 543,505
Claims priority, application Japan, Apr. 1, 1965, 40/18,809
U.S. Cl. 18—30       6 Claims
Int. Cl. B29f 1/03; B29h 5/12

ABSTRACT OF THE DISCLOSURE

Apparatus for injection molding of shoes featuring female mold assembly with stationary section and adjustable side sections, rotating male mold assembly adjustable with respect to female mold permitting injection of molten material into resulting shoe cavity while ejecting molded shoes from and mounting shoemaking parts on male mold assembly.

Figure 1:
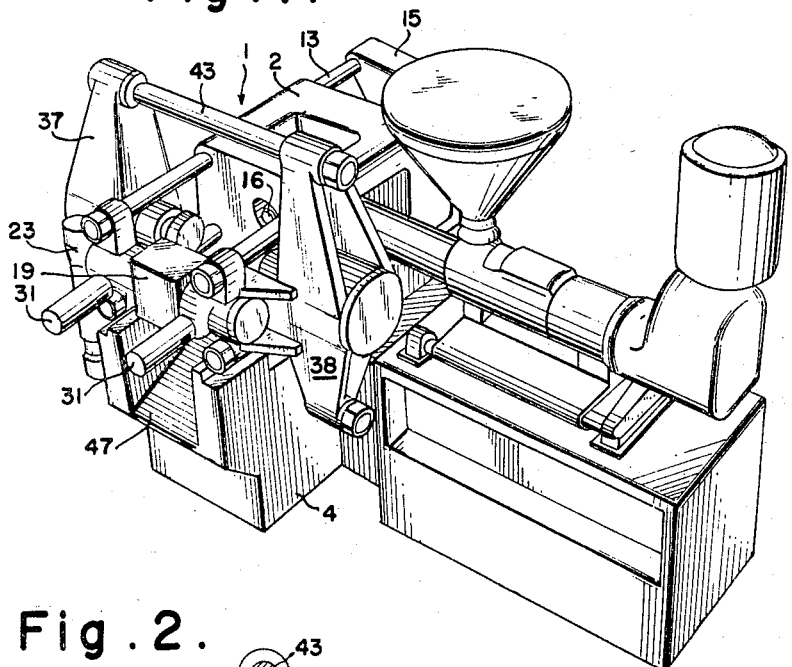

It is an object of the invention to provide an improved injection molding machine of the type suitable for efficient and economical production of shoes.

It is another object of the invention to provide means for injection molding shoes, said means consisting of two or more male molds fitting an opening and closing divided female mold which male molds are provided opposite to each other on a rotary core so as to turn intermittently or reciprocatively.

It is still another object of the invention to provide such injection molding apparatus for making shoes comprising two or more male molds provided opposite to each other on rotary core for fitting and moving to and from an opening and closing divided female mold as well as to turn intermittently or reciprocatively.

Yet another object of the invention is to provide means for injection-molding shoes comprising an opening and closing female mold divided into right and left movable divisional female molds and a front stationary divisional female mold and two male molds provided horizontally opposite to each other on rotary core to fit said female mold, said rotary core being movable to and from female molds to enable said male molds one by one to move toward and away from said female mold and also having a rotary motion to reciprocate said male molds by angles of 180° thereby performing the injection molding operation simultaneously with knock-out of the product and the mounting of shoe parts.

It is also an object of the invention to provide a system for injection-molding shoes comprising an opening and closing female mold divided into three pieces, i.e. right and left movable divisional female molds and a front divisional female mold, rotary core, a pair of right and left divisional female molds, for a pair of shoes, provided horizontally opposite to each other on either side of rotary core for fitting said divided female mold, said rotary core having a reciprocative rotary motion to reciprocate said male molds in a rotary motion by angles of 180°, means for knocking out the molded product, clamping means connected to said rotary core for enabling the latter to move to and from said divided female mold and said molds to touch upon and retreat form said female mold, and hydraulic clamping mechanism connected to said right and left movable divisional female molds associated with said clamping means, thereby fitting and clamping said female mold to and on one of said male molds to conduct the injection molding while at the same time stripping automatically the product off and mounting shoe parts on the remainder one of said male mold.

Yet another object of the invention is to provide a system for injection-molding shoes which is simple and rugged in construction, inexpensive and attractive and yet involves no operational difficulty.

Figure 2:
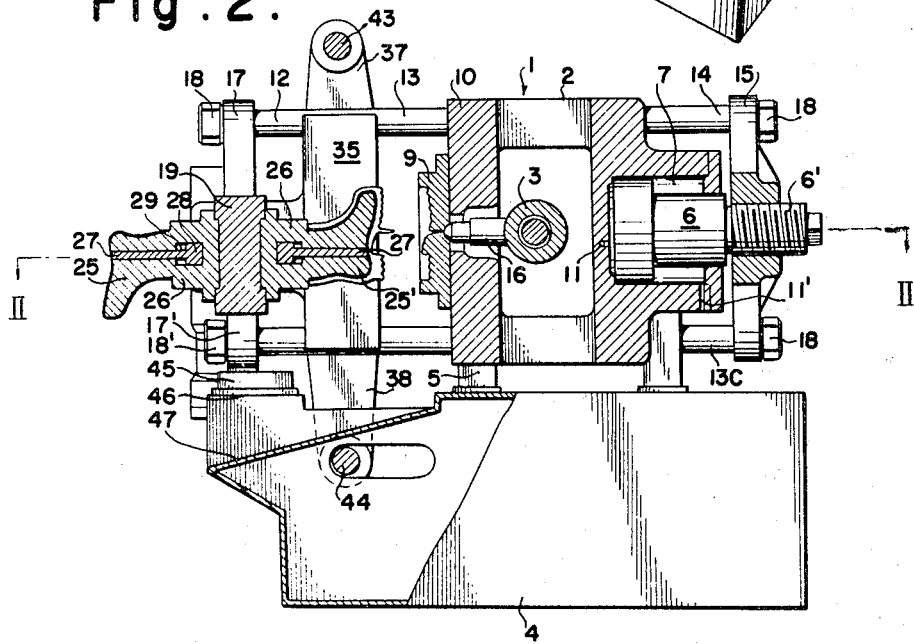
Figure 5:
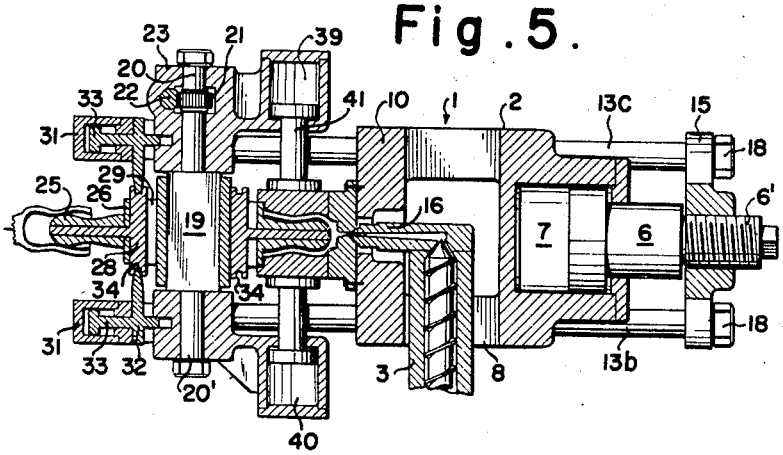
Figure 6:
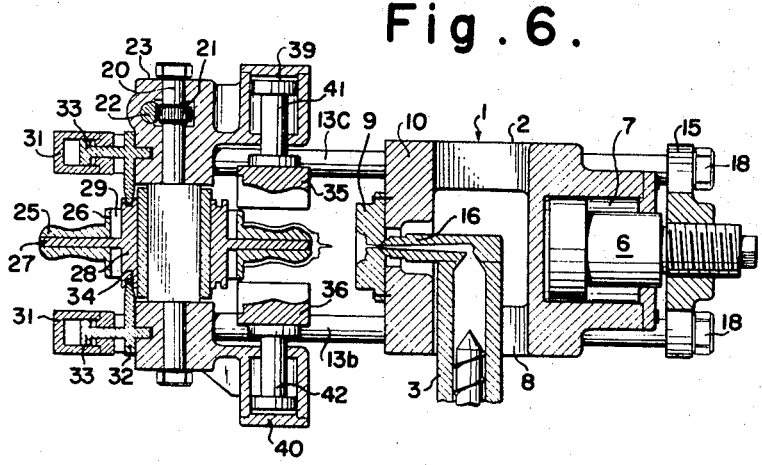
Figure 7:
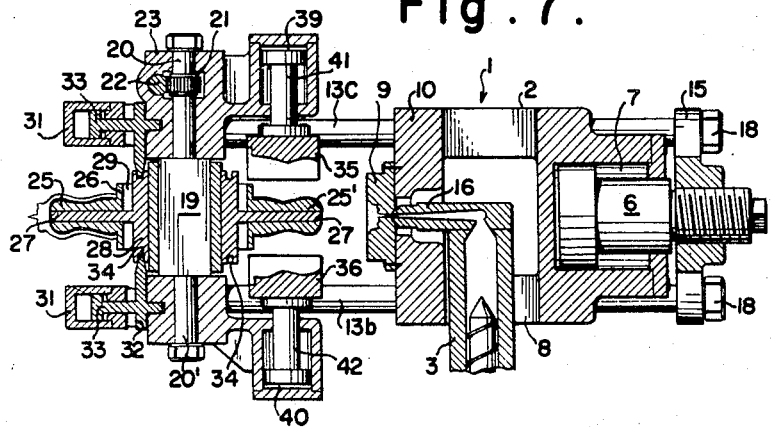
Figure 8:
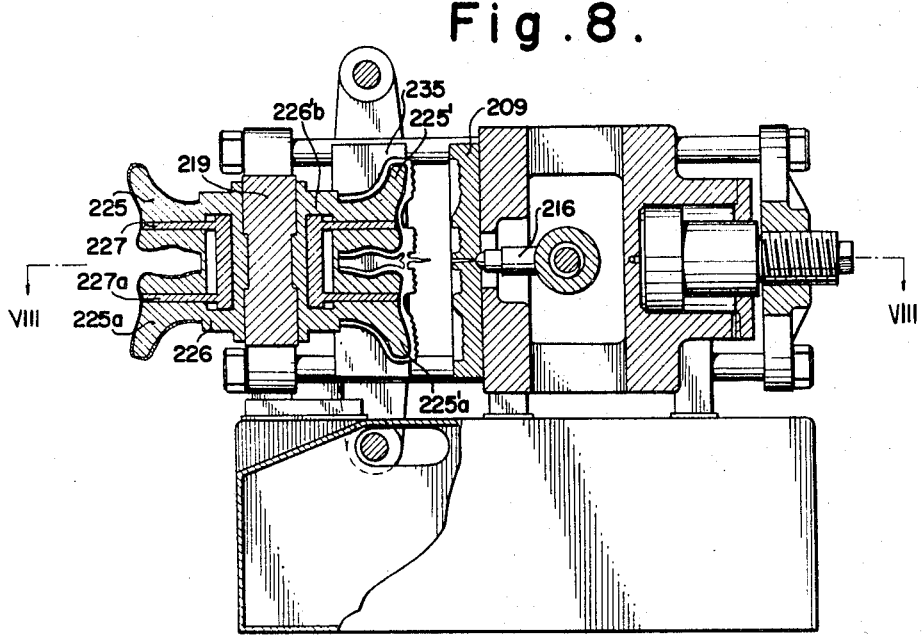
Figure 9:
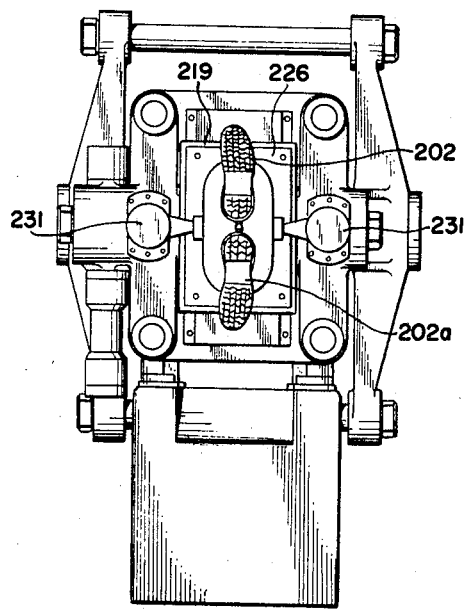
Figure 10:
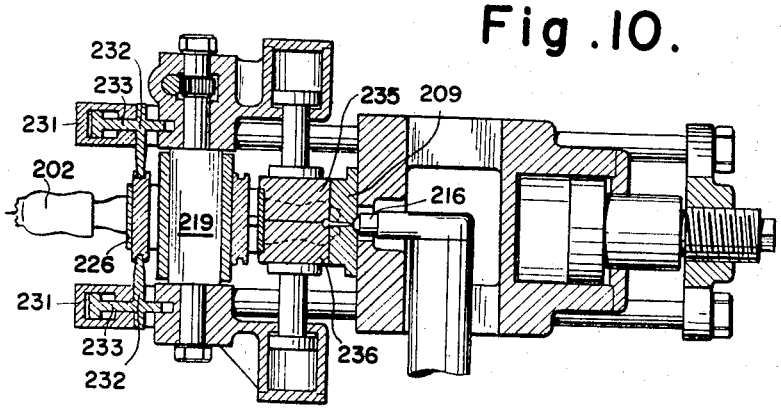

These together with other objects and advantages which will become subsequently apparent for those skilled in the art reside in the details of construction and operation as more fully hereinafter described and claimed, reference being had to the accompanying drawings forming a part thereof wherein like numerals refer to like parts throughout, and in which:

FIGURE 1 is a perspective view of an injection molding machine embodying the invention;

FIGURES 2 through 10 inclusive, show the metallic molds and clamping arrangements associated therewith with the details of the injection system omitted, in which FIGURES 2 through 7 inclusive, specifically illustrate the first embodiment of the invention while FIGURES 8 through 10 inclusive, specifically illustrate the second embodiment of the same with the number of molds increased; FIGURE 2 showing vertical section through a portion of the machine in one of its positions of the injection molding operation; FIGURE 3 being a front view showing molds with clamping arrangements associated therewith; FIGURE 4 being a top view showing molds transversely cut; FIGURE 5 being a cross sectional view taken on line II—II of FIGURE 2, showing the machine in one of its positions of the injection molding operation wherein a molded shoe is knocked out of one of the male molds while the female mold cooperates with the other male mold to close the molding cavity during the molding operation; FIGURE 6 being a cross sectional view taken on line II—II of FIGURE 2, showing the machine in one of its positions of operation wherein shoe parts are mounted on one of the male molds on the one hand while the injection step have been completed and now the molds are released with a molded odd shoe presented on the remainder male mold on the other hand; FIGURE 7 being a cross sectional view taken on line II—II of FIGURE 2, showing the male molds turned by 180° from the position indicated in FIGURE 6; FIGURE 8 being a vertical sectional view through a portion of the machine, similar to FIGURE 2; FIGURE 9 being a front view similar to FIGURE 3 and FIGURE 10 being cross sectional view taken on line VIII—VIII of FIGURE 8, similar to FIGURE 5.

Indicated generally by the reference characters A and B indicate an injection unit and clamping system respectively, and the numeral 1 designates a body of the clamping system. Fixedly connected to a bed 4 thereon through a support 5 is a base 2 of said body 1. The bed 4 has thereon an injection unit such as an injection heating cylinder 3 at a right angle to which is positioned the body 1 in the form of T. The base 2 of the clamping system includes at its rear a hydraulic cylinder 7 having a hydraulic piston 6 slidably mounted therein, an opening 8 provided on front side of its center for inserting therein the heating cylinder 3 and a mount 10 connected fixedly to a stationary divisional female mold 9 (described hereinafter). The base includes also passages 11, 11' provided therethrough for connecting said hydraulic cylinder 7 to a usual hydraulic pump (not illustrated). The hydraulic piston 6 has a head 6' screwed into a draft or draw plate 15 to connect in a body thereto which plate 15 is carried on four draft or draw shafts 13, 13a, 13b, 13c at bases 14 thereof which shafts extend forward slidably through the base 2 at the four inside corners thereof to their ends 12. The stroke of the piston 6 may be adjusted by turning said head 6' whereby the molding thickness may be controlled. The injection heating cylinder 3 has a nozzle 16 bent at its end substantially by a right angle to oppose the stationary divisional female mold 9.

A pair of supporting frames 17, 17' are arranged on said four draw shafts at the forwardly extending ends 12 thereof which shafts are slidably inserted through the base 2 of the mold clamping system, thereby connecting the upper shafts 13, 13a respectively to the lower shafts 13b, 13c. The numeral 18 designates a connecting nut for locking said shafts at each end thereof.

The supporting frames 17, 17' carrying said draw shafts at upper and lower positions thereof have rotatable shafts 20, 20' inserted therethrough substantially at their centers which shafts 20, 20' rotatably support rotary core 19 and are carried by bearings at ends thereof. There is provided on one of the rotatable shafts 20, 20' the rack and pinion adjustment to rotate the rotary core 19, in which a rack 22 engages a pinion 21 fitted around the rotatable shaft 20. The rack and pinion adjustment is mounted in a projection 23 on the supporting frame 17 as clearly shown in FIGURES 4 through 6 inclusive. The rack 22 connects at its lower end to a hydraulic piston (not illustrated) mounted in a hydraulic system 24 connecting beneath said projection 23 so that said piston will slide vertically to raise and lower the rack 22 which in turn permits the pinion 21 to turn reciprocatively whereby the rotatable shaft 20 is also turned reciprocatively. The limits of the turning are fixed so that the rotary core will reciprocatively turn by angles of 180°. In this case, a geared motor may be applied in place of said rack and pinion mechanism for intermittently turning the rotary core by angles of 180°.

A pair of male molds 25, 25' are mounted horizontally opposite to each other through mounts 26, having a peripheral surface 26' in the form of circular arc, on the rotary core 19 on both sides thereof, which take the form of the requisite molded product, for example, an odd boot in the illustrated embodiment. The male molds 25, 25' are arranged respectively facing inversely each other for being adapted to the hereinafter-described divided female mold, see FIGURE 2.

The male molds 25, 25' provided horizontally opposite to each other on the rotary core 19 includes ejection pins 27 extended slidably therethrough which pins have ejection plates 28 constituting bases thereof. The ejection plates 28 are positioned in cavities 29 provided through the mounts 26 in such a manner that they slide in the longitudinal direction. This sliding motion is assured by the ejection plates 28 extending into the mounts 26 on both sides thereof to cooperate at their ends 30 with working plates 32 of hydraulic cylinders 31 which are provided respectively in front of the supporting frames 17, 17' with their working plates 32 provided transversely and ahead of working pistons 33 in said hydraulic cylinders so that they may be fitted at their ends into grooves 34 of the foregoing ejection plates 28 whereby the working plates 32 are in motion in the same manner as the pistons 33 when the latter slide in the longitudinal direction which working plates in turn enable the ejection plates 28 together with the ejection pins 27 to move back and forth. The engagement of the fitting grooves 34 of the ejection plates 28 with the working plates 32 may be attained when the pistons 33 of the hydraulic cylinders 31 advance (to positions shown in FIGURE 5) at which time they engage each other with one of the male molds 25 turned counter-clockwise by angle of 180° from the position where the male mold opposes the female mold. For this purpose, the working plates 32 are machined to be inwardly bevelled along their peripheral edges for the convenience of the fitting engagement. The pistons 33 have respectively rods with ends thereof held slidably in keeholes in the supporting frames 17, 17'.

As one of its features, this invention contemplates the use of a divided female mold consisting of the foregoing stationary female mold division 9 and a pair of movable female mold divisions 35, 36 disposed in opposition at a right angle to the axis of said male molds. The pair of movable female mold divisions 35, 36 are mounted on rods of working pistons 41, 42 at ends thereof which pistons are mounted in hydraulic cylinders 39, 40 mounted on clamping frames 37, 38 made in a body with the supporting frames 17, 17', so as to be opened and closed as said working pistons advance and retreat.

It is understood that the above-mentioned stationary female mold division and movable female mold divisions should be shaped to the male molds, and in the illustrated embodiment, the stationary female mold division 9 is adapted to the sole of boots such as high boots or half boots, while the movable female mold divisions 35, 36 are adapted respectively to halves of the upper including top of such boots. It may be clear for those skilled in the art that the movable divisional female molds may be adapted to only an instep strap.

The movable female mold divisions 35, 36 have the same circular-arc section as that of the periphery 26' of the mounts of the male molds on the portions where they come in contact with each of the male molds. The reason is that the molds are adjusted to minimize their inside dimensional inaccuracies thus assuring accurate fit of the molds.

Tie rods 43, 44 extend through and between the mold clamping frames 37, 38 at the top and bottom of the latter respectively to bear against the hydraulic operation.

The foregoing supporting frames 17, 17' are fixedly connected to four draw shafts 13, 13a, 13b, 13c extending from the base 2 of the mold clamping system with a pair of guide tracks 45 provided at their feet, on a bank 46 of the bed 4. Said bank slopes forwardly so as not to be in the way of the foregoing male mold 25', when the latter turns reciprocatively.

The rotary core 19 supporting the aforesaid pair of male molds is not positioned axially on a level with a nozzle 16 of the injection heating cylinder 3 as seen from FIGURE 2. This aims at the uniform injection of molten materials into the cavities by positioning the gate and runner at the center of the mold. However, they may be positioned axially on the same level with each other depending on the shape of the molds (i.e. the shape of the molded product).

The hydraulic means may be of usual mechanism. The details of the hydraulic oil circuits and passages are omitted here for the greater part thereof to simplify the description. The details of the oil pressure feeding means, electrical circuits and interlock arrangements respectively for operating the hydraulic means and of the water passages for cooling the molds are commonly known, so that they are omitted, too.

In the operation of the present machine, such shoe making parts 100 as lining, for example, of flannel or knit, a top strap and canvas are mounted on one of the male molds 25' and the hydraulic cylinder 24 is operated to turn the rotary core 19 by 180° whereby the male mold 25' having parts 100 mounted thereon will be turned to oppose the divided female mold, see FIG. 2.

Upon completion of the turning to the predetermined point, the hydraulic oil is fed under pressure to the hydraulic cylinders 39, 40 on the mold clamping frames 37, 38 to operate the pistons 41, 42 thereby moving the movable female mold divisions 35, 36 toward the male molds 25'. Now, the oil is fed under pressure through the passage 11 to the hydraulic cylinder 7 to advance the piston 6 in the direction of the arrow together with the draw plate 15 which in turn moves the four draw shafts 13, 13a, 13b, 13c in the same direction to draw the supporting frames 17, 17' thus permitting the aforesaid male mold 25' to abut against the stationary female mold division 9 and stop. When the male mold 25' touches upon the female mold divisions 9, 35, 36, molten injection materials in the injection heating cylinder 3 are injected through the nozzle 16 into the molding cavity to complete the injection molding operation. Meanwhile, the male mold 25 is out of the clamping arrangements on which mold the hereinbefore-described shoe parts 100 are mounted. Now, the completion of the injection molding step on the male mold 25' is followed by the retraction of the piston 6, the draw plate 15 and the supporting frames 17, 17' to detach the male mold 25' from the stationary female mold division 9 simultaneously with the retraction of the movable female mold divisions 35, 36 by the reverse movement of the piston 41 from the male mold 25' to release the molds resulting in the operation of the aforesaid hydraulic cylinder 24 to turn the male mold now in the opposite direction by 180° to return while at the same time, the parts 100 are fitted to the male mold 25 which is put opposite to the divided female mold. Backing the male mold 25' in its place fits the working plates 32 into the groove 34 of the ejection plate 28. At this time, the hydraulic gears 31 are operated to move back the piston 33 which in turn moves the foregoing working plates and consequently the ejection plate 28 together with the ejection pin 27 will advance to knock out the molded product thereby strip the product automatically off the male mold 25', see FIGURE 5.

While the molded product is knocked out of one of the male molds on the one hand, the injection molding operation is conducted on the remainder male mold on the other hand. The knocking-out is followed by the mounting of the shoe parts and meanwhile, the injection molding operation is still continued. When these steps get through, the male molds are back to start another series of such steps thus repeating the same operation to produce continuously the molded products.

Reference will now be had to FIGURES 8 through 10 inclusive, wherein there is illustrated another embodiment of the invention.

The construction according to this embodiment is nearly the same as has been described about the first embodiment. While a pair of male molds adapted to an odd shoe are arranged on a rotary core for making the odd shoes in the first embodiment, a pair of male molds adapted to a pair of shoes are arranged on a rotary core on either side thereof whereby the pair of shoes may be made in one cycle of operation in the second embodiment. The difference of the second embodiment from the first embodiment is in the male molds provided on the rotary core and the female mold fitting with the male molds. The essential construction and operation of these two embodiments, however, are the same. Referring now to the drawings, a vertically arranged pair of male molds 225, 225a (225', 225'a) are provided horizontally opposite to each other on either side of rotary core 219 for applying to a pair of shoes. The male molds 225, 225a and 225', 225'a mounted respectively on mounts 226, 226'a wherein provided are ejection plates including ejection pins 227, 227a respectively extending therefrom for knocking out molded products 202, 202a. The knocking-out operation is the same as in the first embodiment, which may be performed by means of hydraulic cylinders 231 and working pistons 232 cooperating with the foregoing ejection plates. The divided female mold consists of a pair of movable female mold divisions 235, 236 and a stationary female mold division 209, as in the first embodiment. The movable female mold divisions have respective impressions vertically opposed to each other fitting with the above-mentioned male molds 225, 225a or 225', 225'a one-sidedly. The stationary female mold division 209 has also two impressions provided vertically. The molten injection materials may be injected through a gate and sprue into upper and lower cavities from a nozzle 216 positioned in the stationary female mold division at the center thereof. In place of the nozzle 216, branch nozzles may be used in which case each nozzle may inject the molten injection materials separately into the upper or lower cavity.

The above is the point wherein the second embodiment differs from the first embodiment with the exception of the mold clamping means and injection heating cylinder which are nearly the same as in the first embodiment and thus need no language. The molding operation, being the same as in the first embodiment also needs no description. The above point will be self-evident for those skilled in the art by referring to the description of the first embodiment in conjunction with the construction and arrangement illustrated in the drawings.

Thus, among others, the objects of the invention as specifically aforenoted are achieved. Obviously, numerous changes in construction and rearrangements of the parts may be resorted to without departing from the spirit of the invention as defined by the claims.

What is claimed is:
1. An injection molding machine, comprising:
 (a) female mold assembly means including a bottom section and two side sections together with means moving said side sections toward and away from each other;
 (b) at least two male mold assembly means generally complementary in configuration with respect to said bottom and side sections of said female mold assembly means defining therebetween a complete shoe cavity, together with means rotating said male mold assembly means;
 (c) means moving said male mold assembly means toward and away from said female mold assembly means;
 (d) means injecting molten material into said cavity as said male and female mold assembly means are together; and
 (e) means simultaneously ejecting molded shoes.
2. An injection molding machine as in claim 1, wherein said bottom section of said female mold assembly means is stationary.
3. An injection molding machine as in claim 2, including means mounting shoemaking parts on said male mold assembly means after said molded shoes are ejected.
4. An injection molding machine as in claim 3, wherein said means rotating said male mold assembly means includes a rotating core to which said male mold assembly means is attached, said core located to rotate along an axis generally perpendicular to an axis of said male mold assembly means running from the top to bottom of shoe configuration.
5. An injection molding machine as in claim 4, wherein said means rotating said male mold assembly means includes an hydraulic system.
6. An injection molding machine as in claim 5, wherein said means moving said male mold assembly means toward and away from said female mold assembly means includes an hydraulic system.

References Cited
UNITED STATES PATENTS

| | | | |
|---|---|---|---|
| 3,255,491 | 6/1966 | Hardy | 18—17 |
| 3,255,493 | 6/1966 | Tutt | 18—42 |
| 3,305,895 | 2/1967 | Ludwig | 18—34 |
| 3,339,231 | 9/1967 | Piotrowski | 18—5 |

WILBUR L. McBAY, *Primary Examiner.*

U.S. Cl. X.R.

18—17